(No Model.) 2 Sheets—Sheet 1.

J. H. MITCHELL.
OVEN.

No. 558,654. Patented Apr. 21, 1896.

WITNESSES:
Edward C. Roustand.
E. D. Wright.

INVENTOR
James H. Mitchell.
BY A. M. Pierce,
ATTORNEY

ANDREW B. GRAHAM, PHOTO-LITHO. WASHINGTON, D.C.

(No Model.)
J. H. MITCHELL.
OVER.
No. 558,654.
2 Sheets—Sheet 2.
Patented Apr. 21, 1896.
Fig. 3.
Fig. 4.
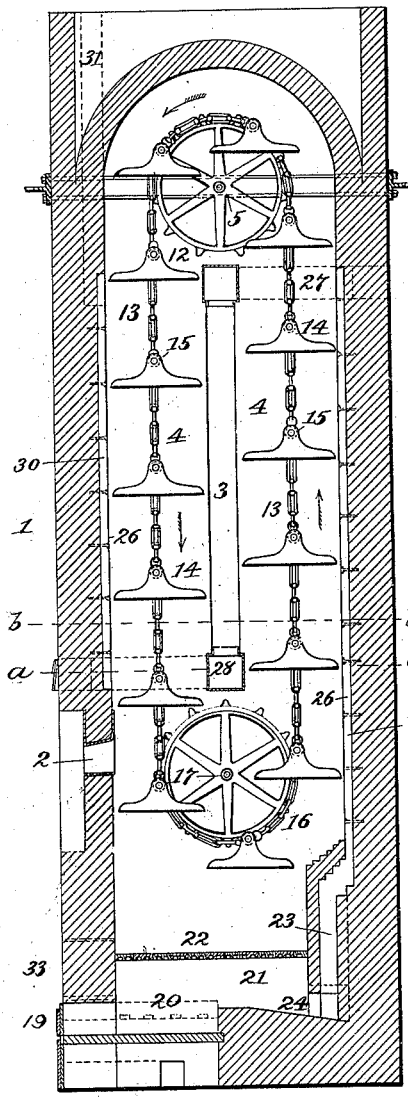
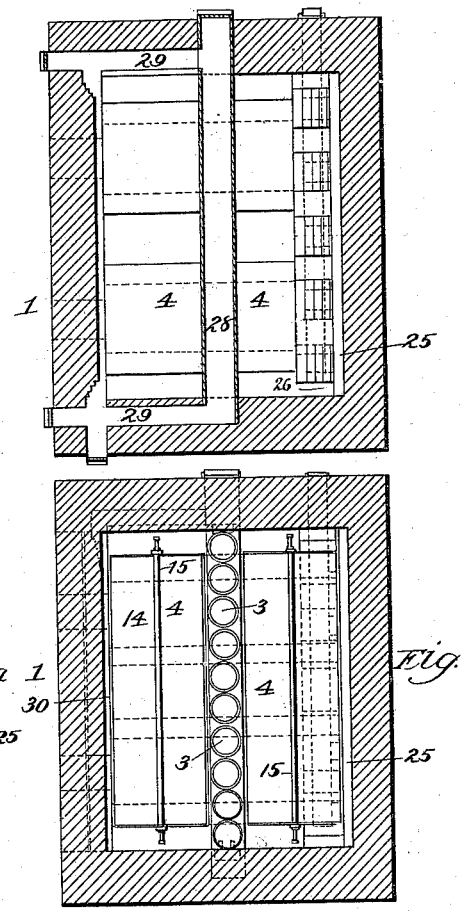
Fig. 5.
WITNESSES:
Edward C. Rowland.
C. D. Wright
INVENTOR
James H. Mitchell.
BY
A. M. Pierce,
ATTORNEY

UNITED STATES PATENT OFFICE.

JAMES H. MITCHELL, OF PHILADELPHIA, PENNSYLVANIA.

OVEN.

SPECIFICATION forming part of Letters Patent No. 558,654, dated April 21, 1896.

Application filed June 15, 1895. Serial No. 552,967. (No model.)

*To all whom it may concern:*

Be it known that I, JAMES H. MITCHELL, a citizen of the United States, residing in Philadelphia, county of Philadelphia, and State of Pennsylvania, have invented a new and useful Improvement in Ovens, of which the following is a specification.

My invention relates especially to ovens for bakers' use, and has for its object the provision of an oven wherein effective means are employed for mixing, churning, or mingling the heated air so as to produce uniform and equal baking action.

To attain the desired end my invention consists in certain novel and useful combinations or arrangements of parts and peculiarities of construction and operation, all of which will be hereinafter first fully described, and then pointed out in the claims.

Figure 2:
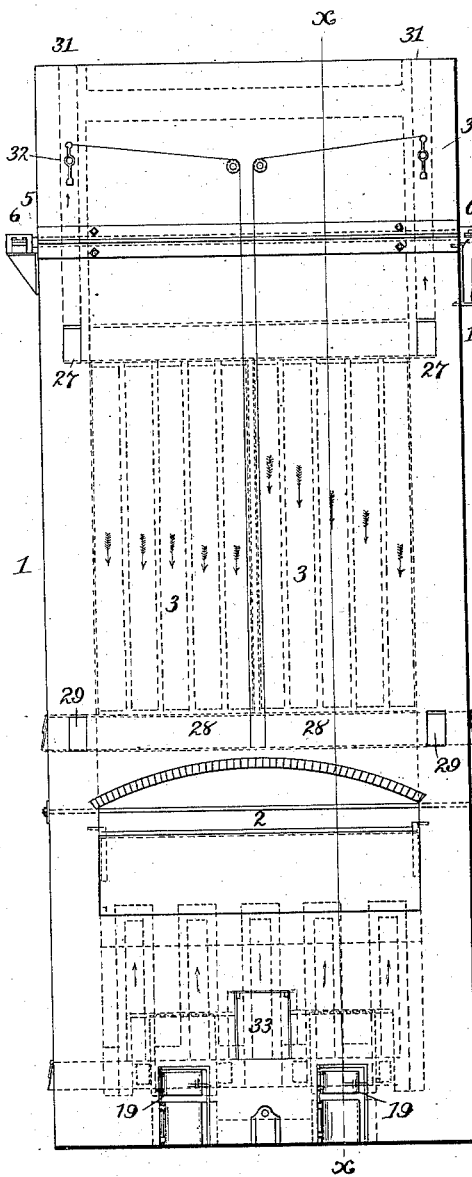
Figure 1:
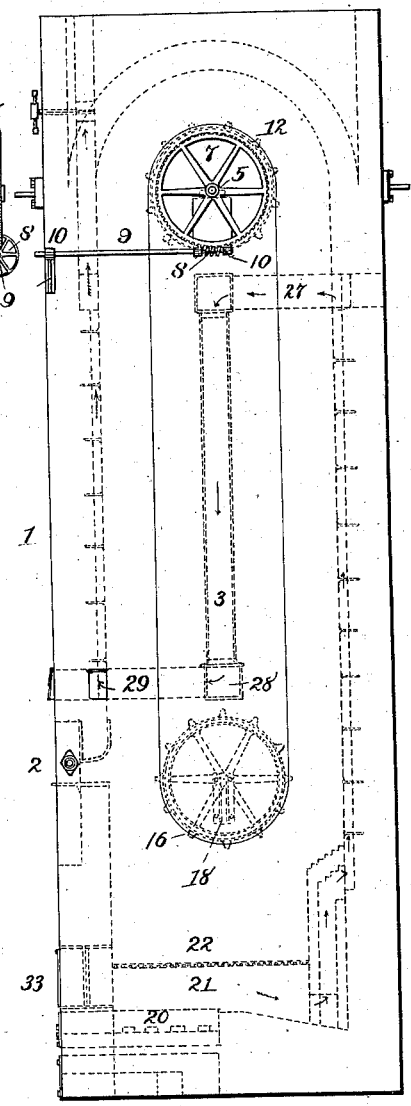

In the accompanying drawings, forming a part hereof, Figure 1 is a side elevation of my improved oven, and Fig. 2 is a front elevation thereof. Fig. 3 is a vertical sectional view at line $xx$ of Fig. 2. Fig. 4 is a horizontal sectional view at line $a\,a$ of Fig. 1, and Fig. 5 is a like section at line $b\,b$ of the same figure.

Similar numerals of reference wherever they occur indicate corresponding parts in all the figures.

The object of this invention is to provide two vertical channels or passage-ways parallel with each other, both being joined together at the top and bottom. The sides of the vertical channels have heat-radiating surfaces. Within the passages are traveling cages or trays, which ascend and descend in a continuous line of travel through the two vertical heated passages or channels, thereby coming in close proximity to the heated sides, but never remaining stationary, so as to interfere with the complete circulation of the baking heat; but, on the contrary, by their travel upward and downward through the two vertical channels continually mixing the heated air, thereby insuring a thorough mingling and the maintenance of a uniform unvarying heat throughout the entire oven.

I am aware that revolving reels with hanging plates attached to them have been employed in square chambers and revolving therein have caused a certain amount of circulation of the heated air within the open oven; but the center of the space has not been affected by the circulation of the plates, owing to the fact that no inclosed channel for the moving plates has been provided, while in my improved oven the heated air is actually lifted in one channel and caused to descend in the other channel by reason of the comparatively close-fitting traveling trays or platforms which fill a cross-section of the channel, and by this movement causing an ascending suction in one channel with a corresponding descending suction in the other channel. Thus section after section of heated air is imprisoned between the successive traveling platforms and is brought in contact with the radiating-surfaces of the sides of the channel-ways in passing through them, and as the platforms or trays approach the upper portion of the oven this imprisoned section of highly-heated air is liberated, and following the descending platforms into the other channel it is again imprisoned and carried downward through the second heated channel, with its radiating sides, and is again liberated and reimprisoned between the traveling platforms as they turn at the bottom of the oven.

In addition to the heat radiating from the walls or sides of the channels there is auxiliary heat ascending from the covered fires in the bottom portion of the oven. The circulating-flues from said fires are carried in any direction back of the radiating-surfaces of the channels.

The products of combustion of the coal are not allowed to enter the baking-chamber, but are confined entirely to the combustion-chamber of each of the furnaces and their respective circulating-flues. The mouth of the oven is so located that more than two-thirds of the interior of the baking-chamber is above the oven-mouth, and as there is no vent for the escape of the heated air in an upward direction it will naturally ascend to the upper portion of the oven and will there accumulate, thereby insuring uniform baking qualities.

There is no waste space in this oven, as every part of it is utilized by the traveling platforms, and the interior is reduced to the smallest possible dimensions, reducing the space occupied by the oven and also the amount and cost of fuel required in baking.

Referring to the drawings, 1 are the brick walls surrounding the oven or baking-space. 2 is the mouth of the oven, and this is the only opening made in the interior wall, with the exception of a manhole 33.

3 are flues forming the two channels 4, which meet at the top and bottom of the oven.

The enchained traveling platforms, which ascend and descend in the direction of the arrows shown in Fig. 3, may be described as follows: 5 is a cross-shaft mounted in bearings 6 on the outside walls of the oven, particularly illustrated in Fig. 2. To the end of this shaft 5 is secured a worm-wheel 7, which engages with a worm 8. This worm is keyed fast to a shaft 9, which is mounted in journals 10. To the end of the shaft 9 is secured a pulley 11 for the purpose of applying power, thereby rotating the shaft 9, worm 8, wheel 7, and shaft 5 all together.

Upon the shaft 5, inside of the oven, are mounted the chain-wheels 12. The teeth of these wheels engage with two chains 13 upon each side of the oven. Suspended freely between these chains are a number of platforms 14. These platforms are composed of a sheet-iron bottom, with two side castings, the upper portions of which are connected to cross-shafts 15, having upon their ends journals which freely rotate in bearings held and supported by the chains 13. The platforms 14 will always hang plumb, insuring by gravity the position illustrated in the drawings as they travel around the chain-wheels, always remaining perfectly horizontal.

16 are chain-wheels located near the bottom of the oven and corresponding with the wheels 12, around which the chains 13 pass. These chain-wheels are mounted upon a shaft 17, which holds them in position, and at the same time allows them to rotate freely. The ends of the shaft 17 project a short distance from the wheels and are mounted in slide-bearings 18, the weight of the chain and platforms being sufficient to keep the chain taut while traveling.

In operating the device as the platforms pass the mouth of the oven pans are placed upon each platform. After all the platforms have been filled a constant rotation is given to the upper chain-wheels by means of the mechanism connected with the shaft upon which they are mounted, which causes the platforms to ascend and descend through the channels 4.

19 are the furnace-doors.

20 are the grate-bars and fire-space.

21 is the combustion-chamber.

22 is the roof of the combustion-chamber, covered with tiling or the equivalent, stopping all communication between the combustion-chamber and the interior of the oven or baking-chamber.

From the chamber 21 the products of combustion and heated gases pass through vertical flues 23 from a horizontal flue 24, which connects with both fires, and are distributed through the short vertical flues 23, which pour their contents into a hot-air space 25, extending across the whole back of the oven. The inner wall 26 of the hot-air space 25 is made of sheet-iron, so as to freely radiate the heat into the ascending channel 4, while the opposite side of this air-space is formed by the wall 1. After ascending to the upper portion of the space 25 the products of combustion pass right and left and enter two horizontal flues 27, which conduct to cast-iron flues 3, located in the center of the oven, and which are joined to a horizontal flue 28, connected to passages or flues 29 in the side walls of the oven, which again lead to a space 30, corresponding to the space 25, hereinabove described, and extending across the front of the oven. From the upper extremity of the chamber 30 the products of combustion pass to outlet-flues 31, provided with dampers 32. The flues 31 lead to any style of chimney communicating with the atmosphere. It will thus be seen that the heat produced by the combustion of the fuel is radiated upward from the tiling 22 from the sides of the space 25, the flues 3, and the space 30, after which the products of combustion are allowed to escape.

Having now fully described my invention, what I claim as new therein, and desire to secure by Letters Patent, is—

1. In an oven, the combination with a series of baking-platforms arranged to travel upward and then downward, of heat-flues adapted to radiate heat upon said platforms, said flues consisting of a passage leading up one side of the oven, communicating with a flue or flues extending downward between the ascending and descending platforms, and therefrom upward upon the opposite side of the oven substantially as shown and described.

2. In an oven of the character herein specified, the combination with two baking-channels connected together at top and bottom, of a series of baking trays or platforms fitting within said channels, and arranged to move upward, and then downward, whereby the heated air is carried through the channels, substantially as shown and described.

3. In a baking-oven, two vertical baking-channels, heat and products-of-combustion conduits forming the outer walls of said channels; a series of central flues communicating with the conduits forming the outer walls of the channels and a series of movable baking-platforms arranged to cause a continuous circulation of the heat within the baking-chamber, substantially as shown and described.

JAMES H. MITCHELL.

Witnesses:
FRANK H. MASSEY,
J. R. MASSEY.